United States Patent [19]
Arai et al.

[11] Patent Number: 5,460,464
[45] Date of Patent: Oct. 24, 1995

[54] CUTTING INSERT

[75] Inventors: Tatsuo Arai; Takayoshi Saito, both of Ibaragi, Japan

[73] Assignee: Mitsubishi Materials Corporation, Tokyo, Japan

[21] Appl. No.: 58,940

[22] Filed: May 7, 1993

[30] Foreign Application Priority Data

May 7, 1992 [JP] Japan .................................. 4-115023
May 15, 1992 [JP] Japan .................................. 4-123841

[51] Int. Cl.$^6$ .................................................. B23B 27/22
[52] U.S. Cl. ................................................ 407/114; 407/116
[58] Field of Search .................................. 407/113, 114, 407/115, 116

[56] References Cited

U.S. PATENT DOCUMENTS 5,207,748 5/1993 Katbi et al. ............................ 407/114

Primary Examiner—Bruce M. Kisliuk
Assistant Examiner—Eileen P. Morgan
Attorney, Agent, or Firm—Mark Catan; Thomas R. Morrison

[57] ABSTRACT

A cutting insert has a polygonal plate-like insert body defined by a front face, a back face, and a plurality of side faces lying between the front and back faces. A nose portion is defined by one of the corners of the front face. At least one cutting edge extends immediately from the nose portion. The cutting edge is defined by one of a pair of intersections of the front face with an adjacent pair of side faces sandwiching the nose portion therebetween. The front face includes an inclined surface sloping toward the back face in a direction away from the nose portion, causing each of the pair of intersections to incline toward the back face in a direction away from the nose portion. A breaker is formed on the inclined surface along the intersection of the inclined surface with a side face. The breaker has an inner surface for defining a rake surface portion more positively inclined to the corresponding cutting edge than that defined by the other area of the front face. The front face may be of a tetragonal shape with a pair of inclined surfaces that impart a V-shaped contour when viewed along a diagonal line interconnecting the corners of the front face other than those defining a diagonally-opposite pair of nose portions. A breaker on such an inclined surface may have a trough line inclined to a corresponding cutting edge. The insert body includes side faces each sloping along the thickness of the insert body at different angles between various regions of the side face, these regions corresponding to various locations of the front face where there are or are not inclined surfaces and where there are or are not corresponding cutting edges.

14 Claims, 9 Drawing Sheets

PRIOR ART

PRIOR ART

CUTTING INSERT

BACKGROUND OF THE INVENTION

1. Field of the Invention

This invention relates to an indexable cutting insert which may be attached to various kinds of insert cutters.

2. Related Art

An end mill that uses a conventional, indexable cutting insert comprises a cylindrical tool body with an axis of rotation and an axially forward end portion with a reduced diameter. A tip pocket, with a diameter that increases gradually in an axially rearward direction, is formed in the forward end portion. An insert-receiving recess is formed in the foremost corner of a bottom of the tip pocket. The corner is located at an axially forward position facing in a direction of the tool body's rotation. An indexable cutting insert fits into an insert-receiving recess and is secured therein by a clamp screw.

The insert is of a positive type. It comprises a plate-like insert body with a pair of generally parallelogrammic front and back faces disposed parallel to each other. The front face serves as a rake surface. The back face serves as a seating surface held in contact with a bottom of the insert-receiving recess. The front face includes a diagonally opposite pair of acute corners formed into a pair of nose portions. The insert body also has two adjacent pairs of side faces lying between the front and back faces. Each adjacent pair of side faces sandwiches a respective nose portion therebetween and intersects the front face at a pair of marginal ridges. The side edges define a peripheral cutting edge and an end cutting edge, which extend directly from the nose portion. A central mounting aperture extends through the thickness of the insert body.

The insert-receiving recess conforms to the outer shape of tile insert body so that, when the insert is secured, the peripheral and end cutting edges and the nose portions protrude from the tool body and can be indexed to active cutting positions. The insert-receiving recess has a flat bottom surface inclined to the axis of the tool body so that the thickness of the forward end portion increases gradually in an axially rearward direction. The recess includes a pair of walls that merge into an inner corner. An internally threaded aperture in the center of the flat bottom surface shifts its axis slightly toward the inner corner from the axis of the central mounting aperture of the insert body when the insert is fitted into the recess. An elliptical recess is formed at the inner corner of the insert-receiving recess.

For mounting the insert on the tool body, the insert is first fitted into the insert-receiving recess. The clamp screw is then turned to bring the back face of the insert body snugly against the flat bottom of the recess. As a result, the shift between the axis of the internally threaded aperture of the insert-receiving recess and the axis of the central mounting aperture of the insert body presses the insert body toward the inner corner of the recess, with the side faces that sandwich the inactive nose portion being held against the walls of the recess. The peripheral and end cutting edges protrude from the forward end portion of the tool body and are indexed properly into peripheral and end cutting positions respectively.

In such an end mill, the insert bears a great cutting load when it engages a work piece. Hence the forward end portion of the tool body, on which the insert is mounted, must be designed to have sufficient rigidity. For this reason, the tip pocket is formed, and the flat bottom of the insert-receiving recess is inclined to the axis of the tool body, so that tile thickness of the forward end portion increases gradually in an axially rearward direction.

However, when the insert, with its parallel rake and seating surfaces, is secured to the insert-receiving recess with its flat bottom inclined as described, the rake surface becomes negatively inclined to the axis of the tool body. Deterioration of cutting performance is the result.

The radial rake angle of the cutting insert is determined by the thickness of the forward end portion of the tool body and the thickness of the insert, for a given outer diameter of the forward end portion of the tool body, on which the insert is mounted. If the forward end portion is to have sufficient rigidity, its thickness cannot be reduced too much. Nor can the thickness of the insert be substantially reduced, since it, too, must be rigid. Thus tile radial rake angle can become unduly negative and cutting performance thereby further deteriorated in an end mill of conventional design.

OBJECTS AND SUMMARY OF THE INVENTION

An object of the present invention is to provide a cutting insert that overcomes the problems of the prior art.

A further object of the present invention is to provide a cutting insert capable of providing excellent cutting performance while ensuring sufficient rigidity of a tool body.

A cutting insert according to the present invention has axial and radial rake angles that are large in the positive direction. The cutting insert has an insert body that includes: a front face that serves as a rake surface and a back face that serves as a seating surface, the front face having an inclined surface sloping at an inclination angle I toward the back face in a direction away from a nose portion defined by one of the corners of the front face; an adjacent pair of side faces sandwiching the nose portion and intersecting the front face at intersections that define an adjacent pair of cutting edges that slope at inclination angles $\beta$ and $\delta$, respectively, toward the back surface; and a breaker formed along one cutting edge. Each of the side faces slopes along the thickness of the insert body at different angles between a region of the side face corresponding to a location at which the front face is inclined and another region of the side face corresponding to a location at which the front face is not inclined.

Briefly stated, the present invention provides a cutting insert having a polygonal plate-like insert body defined by a front face, a back face, and a plurality of side faces lying between the front and back faces. The insert body includes a nose portion defined by one of the corners of the front face, and at least one cutting edge extending immediately from the nose portion and defined by one of a pair of intersections of the front face with an adjacent pair of side faces sandwiching the nose portion therebetween. The front face includes an inclined surface sloping toward the back face in a direction away from the nose portion, causing each of the pair of intersections to incline toward the back face in a direction away from the nose portion. A breaker is formed on the inclined surface along the intersection of the inclined surface with a side face. The breaker has an inner surface for defining a rake surface portion more positively inclined to the corresponding cutting edge than that defined by the other area of the front face. The front face may be of a tetragonal shape and have a pair of inclined surfaces which impart, to the front face, a V-shaped contour when viewed along a diagonal line interconnecting the corners of the front face other than those defining a diagonally-opposite pair of nose portions, and a breaker on such an inclined surface may have a trough line inclined to a corresponding cutting edge. The insert body includes side faces each sloping along the thickness of the insert body at different angles between various regions of the side face, these regions corresponding to various locations of the front face where there are or are not inclined surfaces and where there are or are not corresponding cutting edges.

According to an embodiment of the invention, a cutting insert comprises: a polygonal plate-like insert body defined by a front face, a back face, and a plurality of side faces lying between said front and back faces; said insert body having at least one nose portion defined by a corner of said front face; said insert body having further at least one cutting edge extending immediately from said at least one nose portion and being defined by one of a pair of intersections of said front face with an adjacent pair of side faces of said insert body that sandwich said nose portion therebetween; said front face having at least one inclined surface sloping toward said back face in a direction away from said nose portion; said at least one inclined surface causing each of said pair of intersections to incline toward said back face in a direction away from said nose portion; and said cutting insert further comprising a breaker formed on said at least one inclined surface along an intersection of said at least one inclined surface with at least one side face.

According to a feature of the present invention, a cutting insert comprises: a polygonal plate-like insert body defined by a front face, a back face, and a plurality of side faces lying between said front and back faces; said insert body having at least one nose portion defined by a corner of said front face; said insert body having further at least one cutting edge extending immediately from said at least one nose portion and being defined by one of a pair of intersections of said front face with an adjacent pair of side faces of said insert body that sandwich said nose portion therebetween; said front face having at least one inclined surface sloping gradually toward said back face in a direction away from said nose portion; said at least one inclined surface causing each of said pair of intersections to incline toward said back face in a direction away from said nose portion; and at least one of said side faces slopes along the thickness of said insert body between said front and back surfaces at different angles between a first region of said at least one side face corresponding to a location of said front face where said inclined surface exists and a second region of said at least one side face corresponding to a location of said front face where there is no inclined surface.

According to a first aspect of the present invention, a cutting insert comprises a polygonal plate-like insert body defined by a front face, a back face, and a plurality of side faces lying between the front and back faces, the insert body having at least one nose portion defined by one of the corners of the front face, and at least one cutting edge extending immediately from the nose portion and defined by one of a pair of intersections of the front face with an adjacent pair of side faces of the insert body which sandwich the nose portion therebetween, wherein the front face of the insert body has at least one inclined surface sloping toward the back face in a direction away from the nose portion, the inclined surface causing each of the pair of intersections to incline toward the back face in a direction away from the nose portion. The cutting insert further comprises a breaker formed on the inclined surface along the intersection of the inclined surface with at least one side face.

According to a second aspect of the present invention, in a cutting insert as described above, the insert body has a front face of a tetragonal shape, the insert body including a pair of nose portions defined by a pair of corners of the front face which are interconnected by a first diagonal line of the front face, the front face having a pair of inclined surfaces each sloping toward the back face in a direction away frown a respective nose portion such that the front face has a V-shaped contour when viewed along the second diagonal line of the front face which interconnects the corners of the front face other than the corners defining tile nose portions.

According to a third aspect of the present invention, in a cutting insert according to the above first or second aspect, the front surface has an area where the breaker is formed and another area where the breaker is not formed, the breaker having a first inner surface for defining a rake surface portion inclined in a positive direction to the corresponding cutting edge by a greater extent than a rake surface portion defined by the other area of the front face.

According to a fourth aspect of the present invention, in a cutting insert according to the third aspect, the breaker has a trough defined by the first inner surface and a second inner surface intersecting the first inner surface at a trough line, tile trough line being inclined to the corresponding cutting edge.

According to a fifth aspect of the present invention, a cutting insert comprises a polygonal plate-like insert body defined by a front face, a back face, and a plurality of side faces lying between the front and back faces, the insert body having at least one nose portion defined by one of the corners of the front face, and at least one cutting edge extending immediately from the nose portion and defined by one of a pair of intersections of the front face with an adjacent pair of side faces of the insert body which sandwich the nose portion therebetween, wherein the front face of the insert body has at least one inclined surface sloping gradually toward the back face in a direction away from the nose portion, the inclined surface causing each of the pair of intersections to incline toward the back face in a direction away from the nose portion, and wherein at least one of the side faces slopes along the thickness of the insert body between the front and back surfaces at differed angles between a region of the side face corresponding to the location of the front face at which the inclined surface exists and another region of the side face corresponding to a location of the front face where there is no inclined surface.

According to a sixth aspect of the present invention, in a cutting insert according to the fifth aspect, the front face of the insert body has at least one inclined surface sloping gradually toward the back face in a direction away from the nose portion, the inclined surface causing each of the pair of intersections to incline toward the back face in a direction away from the nose portion, wherein at least one of the side faces slopes along the thickness of the insert body between the front and back surfaces at different angles between a region of the side face corresponding to the location of the front face at which the cutting edge exists and another region of the side face corresponding to a location of the front face where there is no cutting edge.

In a cutting insert in accordance with the present invention, a front face for serving as a rake surface of the cutting insert has an inclined surface sloping toward the back face of tile insert body in a direction away from a corresponding nose portion, and hence, the pair of intersections of the front face with an adjacent pair of side faces sandwiching the nose portion are inclined toward the back face in a direction away from the nose portion. Therefore, when the insert of this construction is secured to an insert-receiving recess, the bottom of which is inclined such that the thickness of the forward end portion of tile tool body increases gradually in an axially rearward direction of the tool body, one of the pair of intersections that serves as a peripheral cutting edge can be inclined toward the back face in an axially rearward direction of the tool body to such an extent as to compensate for the inclination of the bottom of the insert-receiving recess to the axis of the tool body. As a result, the axial rake angle for the insert can be made positive. The above construction is also such that the other intersection disposed at an axially forward position is inclined toward the back face in a direction away from the nose portion. Therefore the radial rake angle for the insert can be made larger in a positive direction than a radial rake angle obtainable with the conventional arrangement.

As is the case with the conventional tool, the forward end portion of the tool body can be designed so that the thickness increases gradually in an axially rearward direction of the tool body. Therefore, a sufficient rigidity can be ensured at this forward end portion.

Thus, according to the present invention, both of the axial and radial rake angles can be set in the positive direction while ensuring sufficient rigidity at the forward end portion of an insert cutter, so that excellent cutting performance can be attained.

Furthermore, the insert body includes a side face sloping along the thickness of the insert body at different angles between regions corresponding to tapered and non-tapered locations and/or locations where there are and are not cutting edges. Therefore, a side face, which is to be brought into abutment with a mounting surface of a tool body to act as a reference indexing surface, can be formed into any desired shape within a region of the side face which is irrelevant to the configuration of the cutting edge and which is not directly related to a cutting operation.

In addition, a breaker formed along a cutting edge permits the rake angle of the cutting edge to be set in a positive direction, thereby further improving the cutting performance and the rigidity of the tool body. When the breaker has a trough line inclined to the cutting edge, the cutting edge can have various cutting conditions between various portions thereof, and an optimum distance between the breaker and the cutting edge can be selected.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 17:
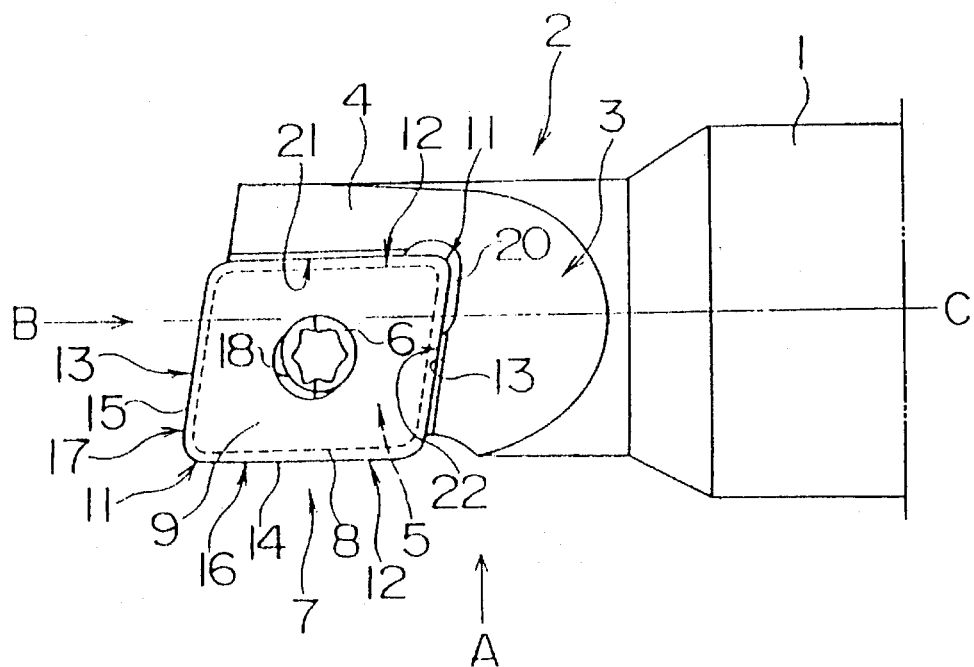
FIG. 17 is a plan view of the relevant portions of an end mill to which a conventional cutting insert is secured.
Figure 18:
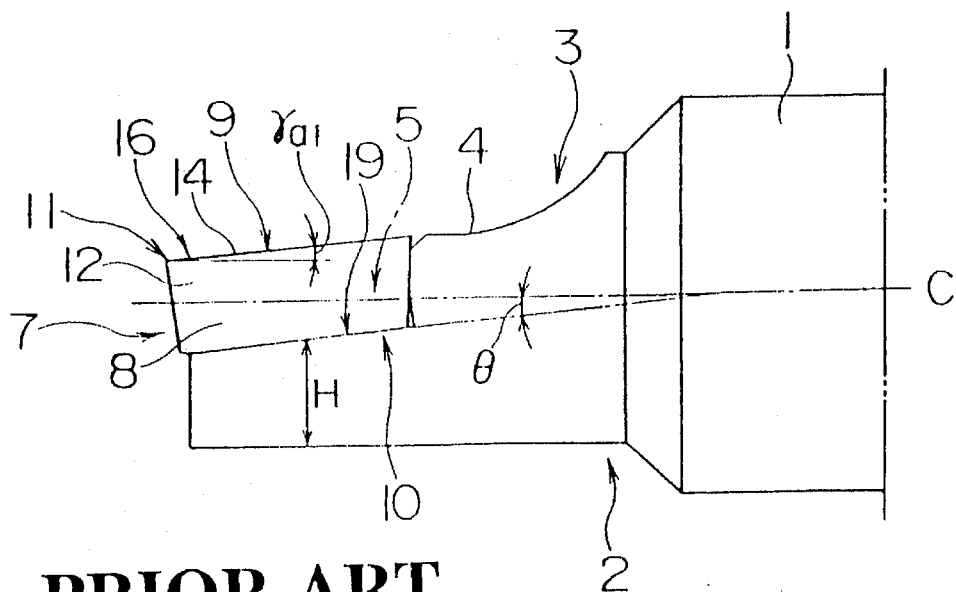
FIG. 18 is a side elevational view of the relevant portions of the end mill of FIG. 17 as seen in the direction indicated by the arrow A in FIG. 17.
Figure 19:
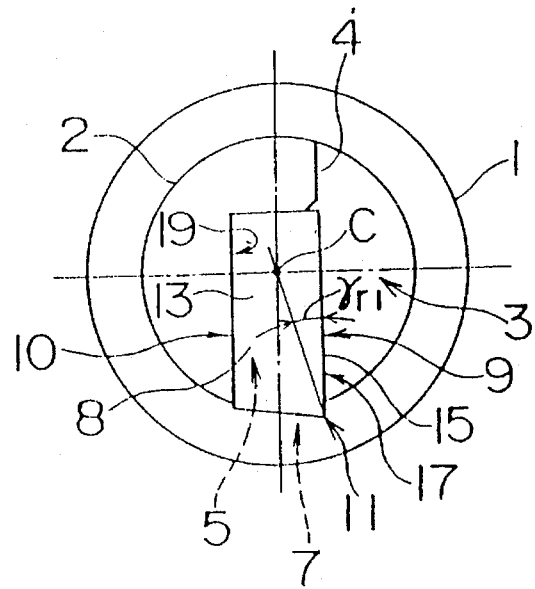
FIG. 19 font elevational view of the end mill of FIG. 17 as seen in the direction indicated by the arrow B in FIG. 17.

Referring to FIGS. 17–19, an end mill that uses a conventional, indexable cutting insert comprises a cylindrical tool body 1 with an axis of rotation C and an axially forward end portion 2 of a reduced diameter. A tip pocket 3 in forward end portion 2 has a diameter that increases gradually in an axially rearward direction. An insert-receiving recess 5 is formed in the foremost corner of a bottom 4 of tip pocket 3, the corner being located at an axially forward position and facing in a direction of tool body 1's rotation. An indexable cutting insert 7 fits into insert-receiving recess 5 and is secured therein by a clamp screw 6.

Insert 7 is of a positive type. It comprises a plate-like insert body 8 having a pair of generally parallelogrammic faces: a front face 9 and a back face 10, which are parallel to each other. Front face 9 serves as a rake surface of insert 7. Back face 10 serves as a seating surface held in contact with a bottom 19 of insert-receiving recess 5. Front face 9 includes a diagonally opposite pair of acute corners, which form a pair of nose portions 11. Insert body 8 also has a plurality of side faces lying between front and back faces 9, 10, the side faces comprising two adjacent pairs of side faces 12 and 13. Each adjacent pair of side faces 12 and 13 sandwich a respective nose portion 11 therebetween and intersect front face 9 at marginal ridges 14 and 15 respectively, so that front face 9 includes two adjacent pairs of side edges, each pair sandwiching a respective nose portion 11 therebetween. The side edges respectively define a peripheral cutting edge 16 and an end cutting edge 17, which extend directly from nose portion 11. A central mounting aperture 18 passes through the thickness of insert body 8.

Insert-receiving recess 5, to which insert 7 is secured, is shaped to conform to insert body 8 so that, when insert 7 is secured, cutting edges 16, 17 and nose portions 11 protrude from tool body 1 and can be indexed in active cutting positions. Bottom 19 of insert-receiving recess 5 comprises a flat surface which, as shown in FIG. 18, is inclined to axis C of tool body 1 so that the thickness H of forward end portion 2 increases gradually in an axially rearward direction of tool body 1. Recess 5 includes a pair of walls 21 and 22 that merge into an inner corner. An internally threaded aperture (not shown) is formed in the center of bottom 19 so that an axis of the aperture is shifted slightly toward the inner corner from the axis of central mounting aperture 18 of insert body 8 when insert 7 is received in recess 5. A recess 20 of an elliptical shape is formed at the inner corner of insert-receiving recess 5.

For mounting insert 7 on tool body 1, insert 7 is first received in insert-receiving recess 5, and clamp screw 6 is then turned to bring back face 10 of insert body 8 into pressing abutment with bottom 19 of recess 5. As a result, insert body 8 is pressed toward the inner corner of insert-receiving recess 5 from the shifting between the axis of the internally threaded aperture of insert-receiving recess 5 and the axis of central mounting aperture 18 of insert body 8, with side faces 12 and 13 sandwiching inactive nose portion 11 being held in abutment with walls 21 and 22 of recess 5, and peripheral and end cutting edges 16 and 17 protruding from forward end portion 2 of tool body 1 and being indexed into peripheral and end cutting positions respectively.

In the end mill described above, insert 7 bears a great cutting load when engaging a work piece. Hence, forward end portion 2 of tool body 1, on which insert 7 is mounted, must be designed to have sufficient rigidity. For this reason, tip pocket 3 is formed, and bottom 19 is inclined to axis C, so that thickness H of forward end portion 2 increases gradually in an axially rearward direction.

However, when insert 7, in which the rake surface and the seating surface are parallel, is secured to insert-receiving recess 5 whose bottom 19 is inclined as described above, the rake surface of insert 7 will also be inclined to axis C. Specifically, as shown in FIG. 18, when an angle defined between bottom 19 and axis C is set to a prescribed value Θ, the axial rake angle $\gamma_{a1}$ for insert 7, though it has the same absolute value Θ, becomes negative. Consequent deterioration of the cutting performance is the inevitable result.

Figure 1:
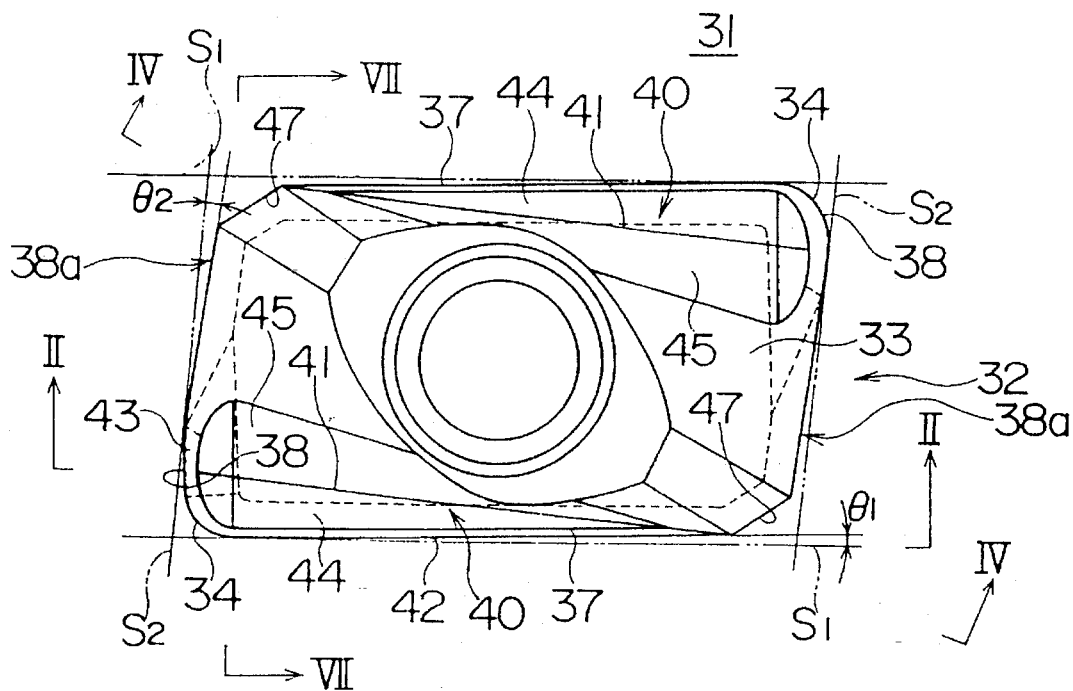
FIG. 1 is a plan view of a cutting insert in accordance with a first embodiment of the present invention.
Figure 2:
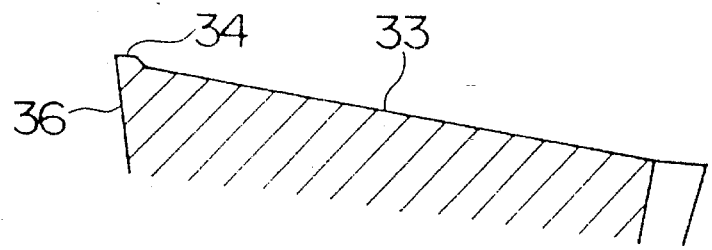
FIG. 2 is a sectional view of the insert of FIG. 1, taken on a plane including a line defined by the arrows II shown in FIG. 1 (that is, a trough line of a breaker of the insert).

The radial rake angle $\gamma_{r1}$ of insert 7 (shown in FIG. 19) is determined by thickness H of forward end portion 2 of tool body 1 and the thickness of insert 7, for a given outer diameter of forward end portion 2 of tool body 1, on which insert 7 is mounted. For forward end portion 2 to have sufficient rigidity, however, its thickness H cannot be reduced too much. Nor can the thickness of insert 7 be substantially reduced, since it, too, must be rigid. As a result of these limitations, the radial rake angle $\gamma_{r1}$ becomes unduly negative, and cutting performance thereby deteriorates further. Referring to FIGS. 1–9, a cutting insert 31 in accordance with a first preferred embodiment of the present invention is of a positive type. It comprises a plate-like insert body 32 defined by: a front face 33, a back face 39, and a plurality of side faces lying between front and back faces 33 and 39. Referring to FIG. 1, front face 33 of insert body 32 has a generally parallelogrammic shape in plan view and serves as a rake surface of insert 31.

Figure 3:
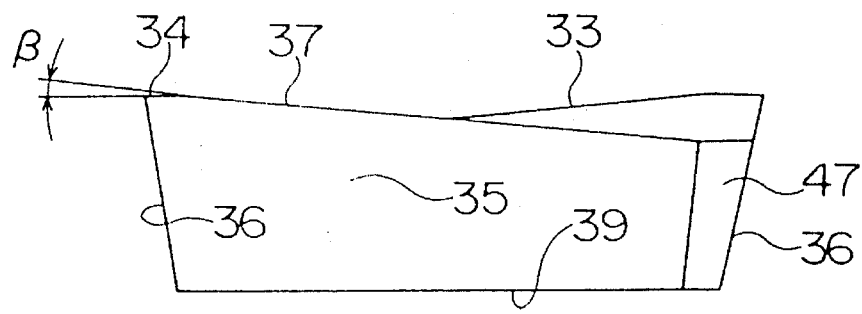
FIG. 3 is a side elevational view of the insert of FIG. 1 as viewed along line $S^2$ shown in FIG. 1.
Figure 4:
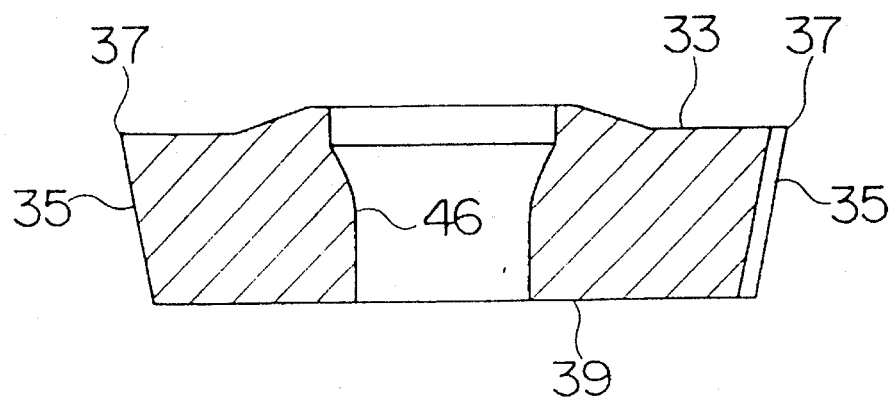
FIG. 4 is a sectional view of the insert of FIG. 1, taken on a plane including a line defined by the arrows IV shown in FIG. 1 (that is, a diagonal line interconnecting a pair of obtuse corners of a tetragonal shape of the insert shown in FIG. 1).
Figure 6:
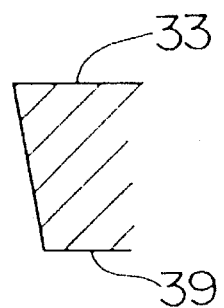
FIG. 6 is a fragmentary sectional view of the insert of FIG. 1, showing the contour of a relief surface of a chamfered portion formed on an obtuse corner of the insert.

Referring to FIGS. 3, 4, and 6, back surface 39 of insert body 32 comprises a flat face perpendicular to its thickness (the distance between front face 33 and back face 39) of insert body 32 to serve as a seating surface to hold insert 31 in contact with the bottom of the insert-receiving recess of a tool body. Front face 33 includes a diagonally opposite pair of acute corners interconnected by a first diagonal line of the generally parallelogrammic shape of front face 33. These acute corners define a pair of nose portions 34.

Referring again to to FIGS. 1–9, insert body 32 has two adjacent pairs of side faces, each pair comprising side faces 35 and 36 sandwiching a respective nose portion 34 therebetween. (In the illustrated embodiment, these side faces comprise relief surfaces having a relief angle of 11°.) Each adjacent pair of side faces 35 and 36 intersect front face 33 at marginal ridges 37 and 38, respectively, so that front face 33 has an adjacent pair of edges sandwiching a corresponding acute corner. Ridges 37 and 38 define an adjacent pair of longer and shorter cutting edges that extend immediately from the corresponding nose portion 34 and serve respectively as a peripheral cutting edge (ridge 37) and an end cutting edge (ridge 38) when the cutting insert is mounted.

Figure 5:
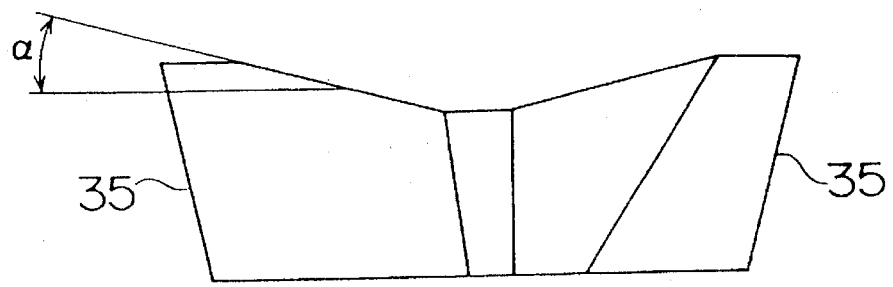
FIG. 5 is a side elevational view of the insert of FIG. 1 as viewed along the diagonal line interconnecting the obtuse corners of the tetragonal shape of the insert shown in FIG. 1.

Front face 33 of insert body 32 has a pair of inclined surfaces. Each inclined surface extends immediately from a respective nose portion 34 and slopes toward back face 39 in a direction away from nose portion 34 as the inclined surface advances toward a second diagonal line of the generally parallelogrammic shape of front face 33. This second diagonal line interconnects a pair of obtuse corners of front face 33. Each inclined surface of front face 33 causes a corresponding pair of ridges 37 and 38 to be inclined toward back face 39 in a direction away from nose portion 34. The inclination angles of ridges 37 and 38 (see FIGS. 3 and 9) are denoted by reference characters β and δ respectively. Referring to FIG. 5, front face 33 has a V-shaped contour when viewed in a side elevation along the second diagonal line, where α designates the inclination angle of the inclined surfaces of front face 33.

The generally parallelogrammic shape of insert 31 is substantially identical to a shape obtained by projecting, in a direction perpendicular to the plane of FIG. 1, the shape of back face 39 in plan view (indicated by the broken lines in FIG. 1) at a certain enlargement ratio determined by the inclination of side faces 35 and 36 of insert body 32. The parallelogrammic shape of insert 31 has two opposite pairs of longer sides $S_1$ and shorter sides $S_2$, as indicated by two-dot-chain lines in FIG. 1. Since front face 33 of insert body 32 is inclined as described above, each of the longer cutting edge ridges 37 is at a position shifted from longer side $S_1$ by an angle of Θ1 (in this embodiment Θ1=1°) and each of the shorter cutting edge ridges 38 is at a position shifted from the shorter side $S_2$ by an angle of Θ2 (in this embodiment Θ2=2°30'). Front face 33 and side faces 35 and 36, with cutting edge ridges 37 and 38 at their intersections, are each formed by moving a grindstone within a two-dimensional plane set at a prescribed angle to the relevant side or end face of a work piece to be formed into insert 31. The operation may be either single-stage or multi-stage. If the latter, the feeding direction is varied as needed. As a result, each peripheral cutting edge ridge 37 as defined by the intersection of two planes, that is, front face 33 and a respective side face 35, is rectilinear.

Figure 7:
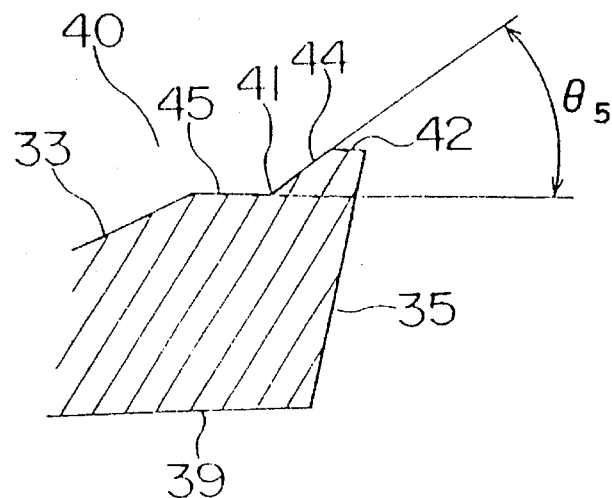
FIG. 7 is a fragmentary sectional view of the insert of FIG. 1, taken on a plane including a line defined by the arrows VII shown in FIG. 1.
Figure 8:
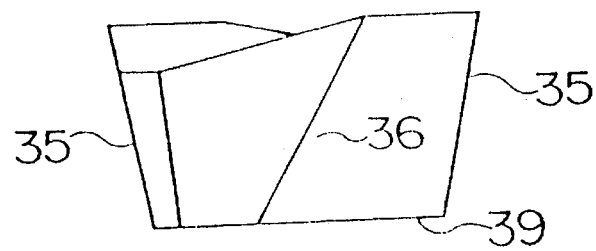
FIG. 8 is a side elevational view of the insert of FIG. 1 as viewed along a relief surface of a peripheral cutting edge of the insert.

A breaker 40 is formed on front face 33 of insert body 32 along each of peripheral cutting edge ridges 37. Referring to FIG. 7, each breaker 40 has a sectional configuration. Referring to FIG. 1, each breaker 40 has a trough line 41 inclined to a corresponding peripheral cutting edge ridge 37. Breaker 40 is formed by, for example, a tool grinder, that linearly moves a grinding member within a plane parallel to back surface 39 in a prescribed direction in which trough line 41, inclined as described above, is to extend. This grinding produces a cut whose size changes gradually in accordance with changes in the inclination of front face 33. As a result, breaker 40 has a breadth and a depth that decrease gradually in a direction corresponding to an axially rearward direction of a tool body in which insert 31 is mounted.

Figure 9:
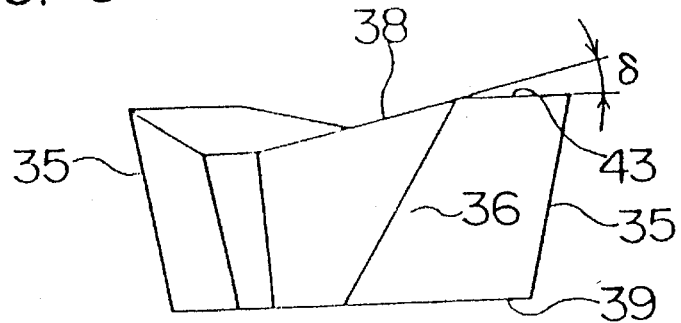
FIG. 9 is a side elevational view of the insert of FIG. 1 as viewed in a direction perpendicular to a portion of the insert shown in FIG. 1.
Figure 10:
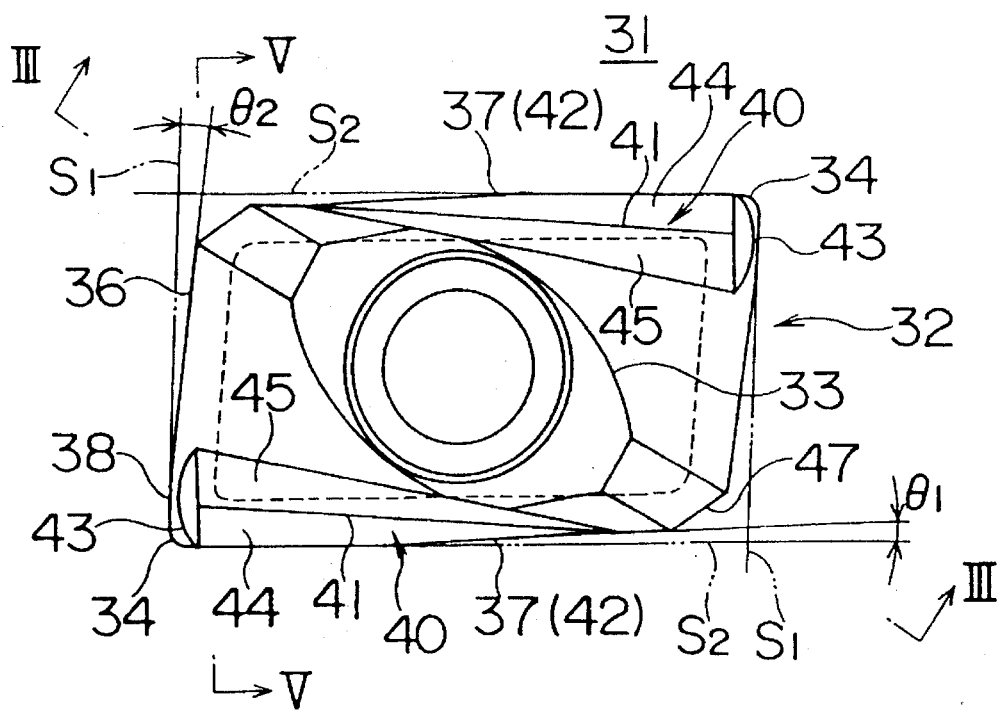
FIG. 10 is a plan view of a cutting insert in accordance with a second embodiment of the present invention.
Figure 11:
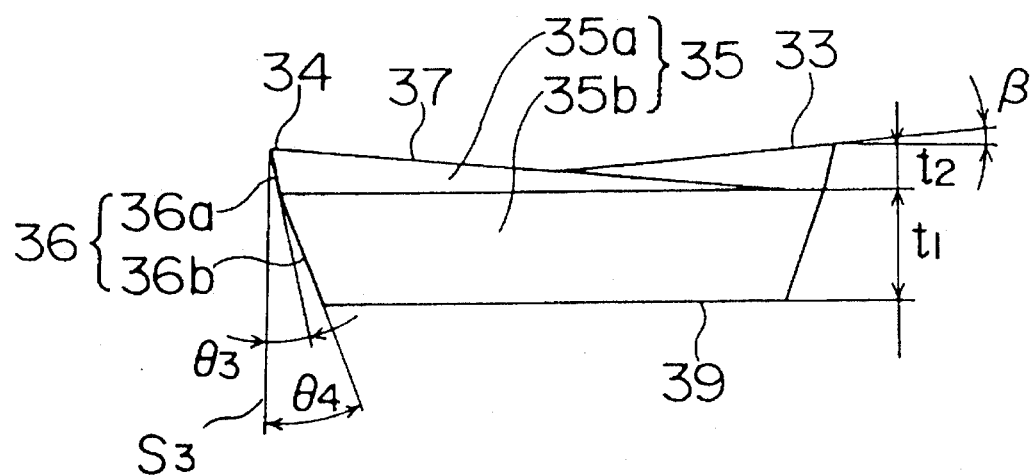
FIG. 11 is a side elevational view of the insert of FIG. 10 viewed along an intersection defining a cutting edge of the insert shown in FIG. 10.

Referring to FIGS. 7 and 9, each breaker 40 is formed at a position slightly inward of corresponding peripheral and end cutting edge ridges 37 and 38, in such a manner that a pair of lands 42 and 43 are formed along the corresponding peripheral cutting edge ridge 37 and end cutting edge ridge 38, respectively. According to this embodiment, land 43 for end cutting edge ridge 38, which has to bear a relatively large cutting load, has a greater breadth than land 42 for peripheral cutting edge ridge 37. Thus end cutting edge ridge 38 is kept from chipping while peripheral cutting edge ridge 37 is ensured a good cutting surface.

Referring again to FIG. 7, each breaker 40 has a first inner surface 44 and a second inner surface 45 that intersect each other at trough line 41. First inner surface 44 is inclined perpendicular to corresponding peripheral cutting edge ridge 37 so that inner surface 44 defines a rake surface portion positively inclined to land 42. In this embodiment, second inner surface 45 is formed at a depth of 0.2 mm from the corresponding nose portion 34 and is negatively inclined to first inner surface 44 by an angle $\Theta_5$ (in this embodiment, $\Theta_5=12°$).

Referring to FIG. 4, insert body 32 has an aperture 46 through a central portion thereof through which passes a screw (not shown) for mounting insert 31. As shown in FIGS. 1 and 4, a portion of front face 33 on the periphery of aperture 46 is generally cylindrical. It is thicker than the other portion of front face 33 to ensure sufficient rigidity of insert body 32.

Referring to FIG. 3, a chamfered portion 47 is formed at each obtuse corner of insert body 32. Chamfered portion 47 has a relief surface that prevents interference between a work piece and a ball end mill that contains insert 31 when the ball end mill is withdrawn.

Figure 14:
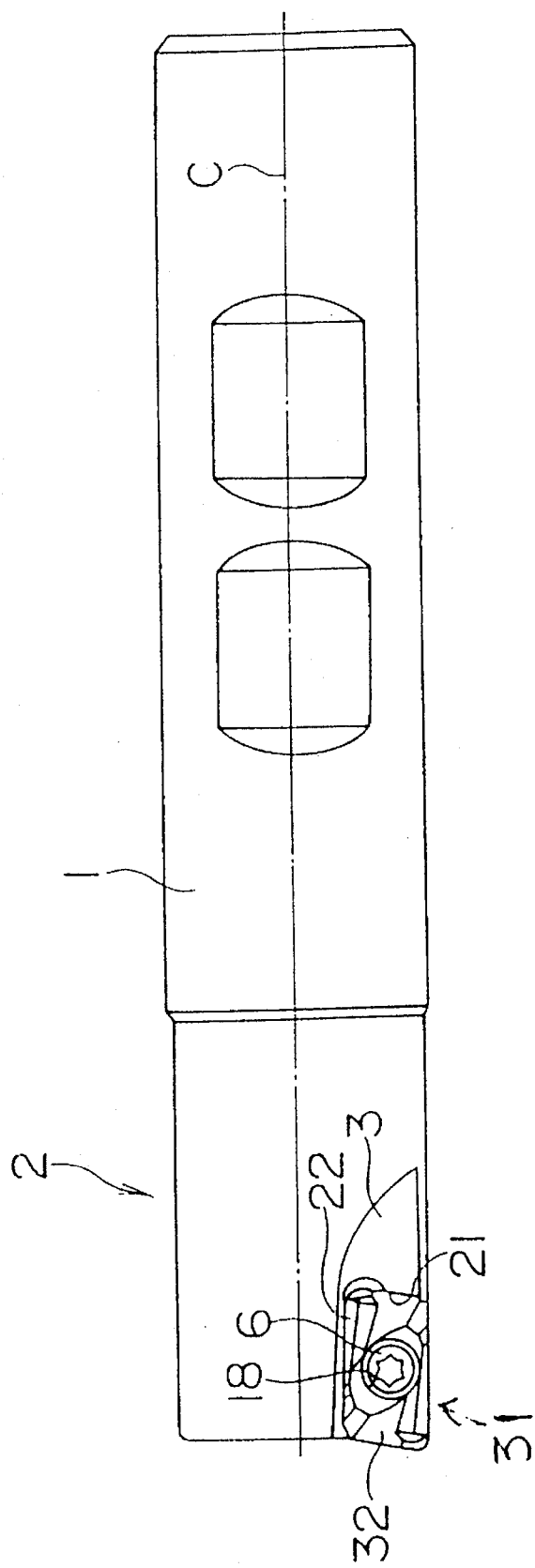
FIG. 14 is a plan view of an insert cutter in which the insert of FIGS. 1 through 10 is attached to a tool body of the cutter.
Figure 15:
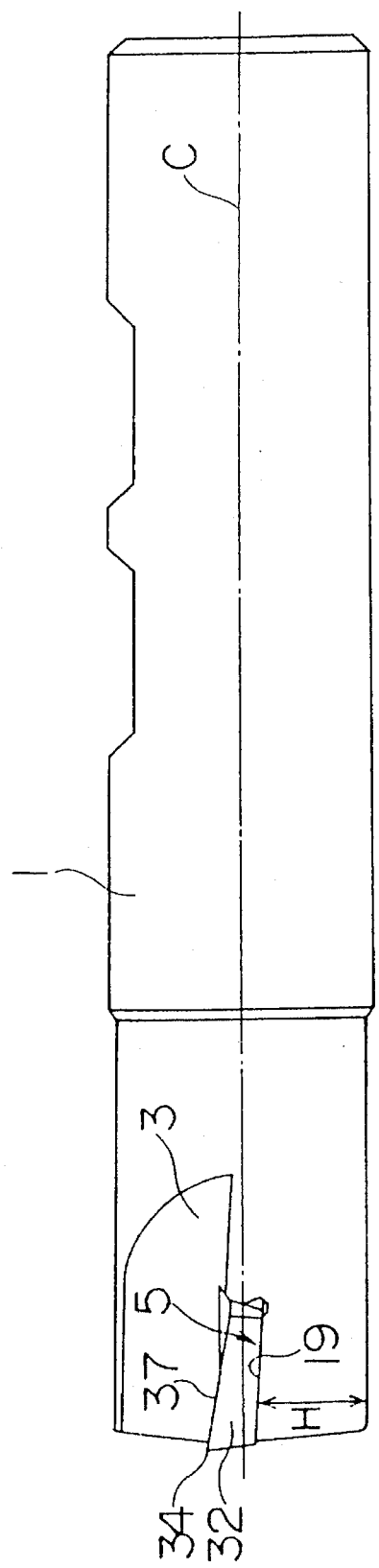
FIG. 15 is a side elevational view of the cutter of FIG. 14.
Figure 16:
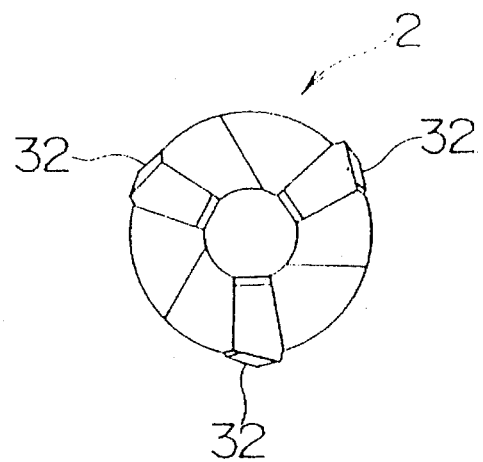
FIG. 16 is a front elevational view of the cutter of FIG. 14.

Referring to FIGS. 14 to 16, an end mill has cutting insert 31 received within insert-receiving recess 5 in tip pocket 3 of tool body 1.

In the end mill, tool body 1 has an axis of rotation C therethrough and axially forward end portion 2 of a reduced diameter. Tip pocket 3 is formed in forward end portion 2, and insert-receiving recess 5 is formed in the foremost corner of bottom 4. Tip pocket 3 is directed in a direction 9f rotation of tool body 1. Cutting insert 31 is received in insert-receiving recess 5 and secured thereto by clamp screw 6.

Insert-receiving recess 5 is sized and shaped so that, when insert 31 is received therein, one of the adjacent pairs of cutting edge ridges 37 and 38, which extend immediately from corresponding nose portion 34, are indexed in active cutting positions (peripheral and end cutting positions respectively) while side faces 35 and 36, sandwiching the other nose portion 34, are held in abutment with walls 22 and 21 respectively. An elliptical recess is formed at the inner corner of insert-receiving recess 5 into which walls 21 and 22 merge, thereby preventing the inactive nose portion 34 from contacting walls 21 and 22 when securing insert 31 to insert-receiving recess 5.

Bottom 19 of insert-receiving recess 5 is flat and inclined to axis C of tool body 1 so that thickness H of forward end portion 2 decreases gradually in an axially rearward direction. In this embodiment, therefore, it is possible to obtain a rake angle greater than that provided by cutting insert 31 itself. Hence one obtains improvement in cutting performance while minimizing the reduction in the rigidity of tool body 1.

Referring to FIG. 14, an internally threaded aperture (not shown) is formed in the center of bottom 19 to cause a shift between the axis of this aperture and the axis of aperture 18 of the mounted insert body 32, just as with the tool body combined with the conventional cutting insert shown in FIGS. 17–19.

Referring to FIGS. 10 to 13, in a second embodiment of the present invention, side faces 35 and 36 of insert body 32 provide relief surfaces for cutting edge ridges 37 and 38 respectively. Side face 35 has an upper side face 35a and a lower side face 35b. Similarly, side face 36 has an upper side face 36a and a lower side face 36b. Thus the geometry of insert body 32 is approximated by a combination of a quadrangular portion (of thickness $t_1$) and a triangular-pyramidal portion (of thickness $t_2$) on the quadrangular portion. The triangular-pyramidal portion has one end or upper surface that is tapered. Thus upper side faces 35a and 36a form the flanks or side surfaces of the triangular-pyramidal portion above the lowermost portion of the tapered end surface, front face 33, i.e., above the portion that extends along the diagonal line interconnecting two obtuse-angle corners, while lower side faces 35b and 36b form the side surfaces of the quadrangular portion.

Figure 12:
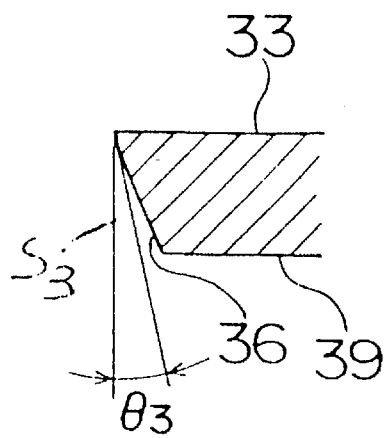
FIG. 12 is a fragmentary sectional view of the insert of FIG. 10 viewed along a side face of the insert shown in FIG. 10.
Figure 13:
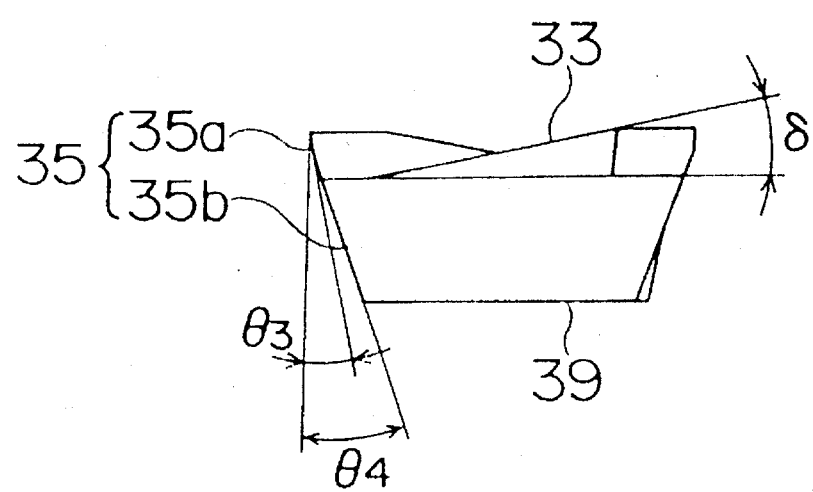
FIG. 13 is a side elevational view of the insert of FIG. 10 viewed along another intertsection defining a cutting edge of the insert shown in FIG. 10.

Referring to FIG. 12, the angle $\Theta_3$ formed between each of upper side faces 35a and 36a and a line $S_3$ perpendicular to back face 39 of insert body 32 is set to 15°. Each of lower side faces 35b and 36b are inclined to line $S_3$ in the positive direction beyond the angle of inclination of upper side face 35a or 36a, thus forming a positive relief angle. After machining upper side faces 35a and 36a with a grinding tool, the lower portions of the side surfaces of insert body 32 are further ground after changing the angle of the tool, thereby forming lower side faces 35b and 36b at a desired angle of inclination.

In this embodiment, that part of the quadrangular portion between lower side faces 35b and 36b is configured in the same way as ordinary tips, i.e., tabular tips with parallel upper and lower faces unlike the tip of this embodiment with its tapered end surface. Thus insert body 32 is interchangeable with other types of tips used in a tool body.

When used with the end mill of the type described, insert 31 is fitted into insert-receiving recess 5. As clamp screw 6 is tightened, insert 31 is seated at its land 42 on bottom surface 19 of recess 5. At the same time, because of offset or eccentricity between the axis of the threaded aperture of insert-receiving recess 5 and the axis of aperture 18, insert body 32 is pressed against the inner corner of insert-receiving recess 5. Consequently, side faces 35, 36 on both sides of one nose portion 34 are brought into contact with walls 21, 22, whereby cutting edge ridges 37 and 38 are precisely located.

As in the preceding embodiment, portions of insert body 32 adjacent to the inactive nose portion 34 are prevented from contacting insert-receiving recess 5 by recess 20 in the inner corner of insert-receiving recess 5. Consequently, cutting edge ridges 37 and 38 can be located with a high degree of precision, and the formation of insert-receiving recess 5 is facilitated.

In the end mill as described, one end surface, front face 33, is inclined at angle a to the other end surface, back face 39. This feature provides greater rake angles, in both the axial and the radial direction, than if the inclination were not there. It is also possible to further enhance the rake angle in the positive direction by using first inner surface 44 of breaker 40.

Lands 42 and 43 are provided between breaker 40 on the one hand and outer peripheral cutting edge ridge 37 and bottom cutting edge ridge 38 on the other. It is therefore possible to keep the rake angles positive without clipping the cutting edges. The breadth of land 43 adjacent bottom cutting edge ridge 38 must be greater than that of land 42 adjacent outer peripheral cutting edge ridge 37, since bottom cutting edge ridge 38 carries a greater cutting load than outer peripheral cutting edge ridge 37. Land 43 thus has a comparatively large breadth, so that it guides the metal dust or chips generated by cutting. Land 42, with its comparatively small breadth, can guide the metal dust or chips directly into breaker 40.

The breadth of breaker 40 progressively decreases from the end of outer peripheral cutting edge ridge 37 towards its base. It is therefore possible to maintain the required level of strength even at the base end portion, which tends to exhibit insufficient strength because of the narrowness of insert body 32.

Cutting edge ridge 37 has a base end in the axial direction toward tool body 1, and a free end in the axial direction away from tool body 1. At the free end of cutting edge ridge 37, breaker 40 is wider and deeper than at the base end. Chips cut by cutting edge ridge 37 near the free end are fed smoothly toward the center of breaker 40 to break against a portion of second inner surface 45 that is relatively remote radially from cutting edge ridge 37. Chips cut by cutting edge ridge 37 near the base end are fed more abruptly in the axial direction into the center of breaker 40 to break against a portion of second inner surface 45, axially closer to the base end, that is relatively close radially to cutting edge ridge 37. In addition, the portion of breaker 40 near the free end of cutting edge ridge 37 must break and guide chips generated by cutting edge ridge 38 as well as those generated by cutting edge ridge 37. The greater depth and breadth of the free-end portion of breaker 40 is suited to this greater chip-breaking and guiding burden.

Although positive-type inserts having relief angles imparted to cutting edge ridges 37, 38 and nose portion 34 have been specifically described as preferred embodiments, it is to be understood that the invention can be equally applied to negative-type inserts.

It will be clear to those skilled in the art that angle α, formed between opposite end surfaces front face 33 and back face 39, and inclination angles β and δ, formed between the back face 39 and the respective cutting edge ridges 37, 38 as a result of the inclination of front face 33, can be suitably determined from such factors as the dimensions and geometry of insert 31 and the conditions of cutting. In ordinary use, in inserts whose shape when viewed in plan is parallelogrammic and which have an acute corner angle of 85° to 70°, as in the above-described embodiment, angle α ranges preferably from 3° to 20°. Therefore angles β and δ range from from 3° to 15° and from 3° to 20° respectively. For example, in the embodiments described above, the acute corner angle of the parallelogram is about 85° and angle α is about 13°, so that angles β and δ are respectively set to about 5° and about 12°.

When inclination angles α, β, and δ are reduced to values below the lower limits of the ranges specified above, i.e., if the gradient of front face 33 is too small, the axial and radial rake angles are not set positive when the insert is attached to a tool such as an end mill, thus impairing the advantages described above. Conversely, when inclination angles α, β, and δ are increased beyond the upper limits of the ranges specified above, i.e., when the gradient of front face 33 is too large, the rigidity and strength of the insert itself may be adversely affected because the central portion of insert body 32 is insufficiently thick.

Although inserts having parallelogrammic planar shapes have been specifically described as preferred embodiments, it is to be understood that such embodiments are not exclusive and the invention can be applied to inserts having other planar shapes such as, for example: square, diamond, or other rectangular shape; triangular shapes; or other polygonal shapes such as pentagon or hexagon. The ranges of inclination angles α, β, and δ specified above are preferably employed when the present invention is applied to an insert with a parallelogrammic planar shape; they may vary with the shape of the insert viewed in plan. Obviously, the preferred ranges of the angles vary also according to the conditions under which the cutting is performed.

The cross-sectional shape of the breaker also may vary without departing from the scope of the present invention. It will also be clear that the present invention can be applied to ordinary cutting tools and to boring bars, although turning tools such as end mills have been specifically mentioned in the description of the preferred embodiments.

As will be understood from the foregoing description, according to the present invention, one end surface of an insert, which is its rake surface, is inclined so that the distance between this end surface and the other end surface, which is its seating surface, progressively decreases from the end adjacent to the nose portion. Consequently, the ridge lines, which are formed by the side faces on both sides of the nose portion and the inclined end surface and which provide the cutting edges, are also inclined towards the other end surfaces. Large positive rake angles both in the axial and radial directions can therefore be preserved without requiring reduction in the thickness of that portion of a tool to which the insert is attached. Thus cutting performance improves without reducing the rigidity of the portion of the tool holding the insert body that contacts and cuts a material of a certain level of cutting resistance.

The side faces of the insert body vary in thickness in the direction of the insert body, so that the portion of each side face where the cutting edge is and the portion without the cutting edge are inclined at different angles. In addition, each side face of the insert body is so designed that a portion of the side face that is either tapered or has the cutting edge is inclined at an angle different from another portion that is either not tapered or has no cutting edge. Therefore the portions of the side faces that press against the insert mounting surfaces of the tool body, and thereby locate the insert body, can have any desired shape without affecting the shape of the cutting edges, within a range that is both independent of the geometry of the cutting edge and not directly related to the cutting work. The insert of the present invention is therefore interchangeable with ordinary flat tabular inserts that do not have inclined end surfaces, and it achieves a substantial improvement in cutting performance.

Furthermore, the breaker formed on one end surface along the cutting edges enables the rake angles of the cutting edges to be further increased in the positive direction, thus facilitating a design that obtains the required rake angles. Consequently, the seat surface of the tool body is thick enough to exhibit the required level of rigidity, while the dust and chips of the cut metal are smoothly discharged by the breaker.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A cutting insert comprising:

a polygonal plate-like insert body defined by a front face, a back face, and a plurality of side faces lying between said front and back faces;

said insert body having at least one nose portion defined by a first corner of said front face;

said insert body having at least one second corner of said front face adjacent said first corner;

said insert body having further at least one cutting edge extending immediately in an uninterrupted straight line from said at least one nose portion substantially to said second corner;

said at least one cutting edge being defined by a one of a pair of intersections of said front face with an adjacent pair of side faces of said insert body that sandwich said nose portion therebetween;

said front face having at least one inclined planar surface sloping toward said back face in a direction away from said nose portion;

said at least one inclined planar surface causing each of said pair of intersections to incline toward said back face in a direction away from said nose portion; and said cutting insert further comprising a breaker formed on said at least one inclined surface along an intersection of said at least one inclined planar surface with at least one side face.

2. A cutting insert as recited in claim 1, wherein:

said front face has a tetragonal shape;

said insert body includes a pair of nose portions defined by a pair of corners of said front face;

said pair of corners are interconnected by a first diagonal line of said front face;

said front face has a pair of inclined surfaces each sloping toward said back face in a direction away from a respective nose portion such that said front face has a V-shaped contour when viewed along a second diagonal line of said front face; and said second diagonal line interconnects corners of said front face other than the corners defining said nose portions.

3. A cutting insert comprising:

a polygonal plate-like insert body defined by a front face, a back face, and a plurality of side faces lying between said front and back faces;

said insert body having at least one nose portion defined by a corner of said front face;

said insert body having further at least one cutting edge extending immediately from said at least one nose portion and being defined by a one of a pair of intersections of said front face with an adjacent pair of side faces of said insert body that sandwich said nose portion therebetween;

said front face having at least one inclined surface sloping toward said back face in a direction away from said nose portion;

said at least one inclined surface causing each of said pair of intersections to incline toward said back face in a direction away from said nose portion;

said cutting insert further comprising a breaker formed on said at least one inclined surface along an intersection of said at least one inclined surface with at least one side face;

said front surface having a first area where said breaker is formed and a second area where said breaker is not formed;

said breaker having a first inner surface for defining a first rake surface portion; and said first rake surface portion being inclined more positively to a corresponding cutting edge than a second rake surface portion defined by said second area.

4. A cutting insert as recited in claim 3, wherein:

said breaker has a trough defined by said first inner surface and a second inner surface intersecting said first inner surface at a trough line; and said trough line is inclined to the corresponding cutting edge.

5. A cutting insert comprising:

a polygonal plate-like insert body defined by a front face, a back face, and a plurality of side faces lying between said front and back faces;

said insert body having at least one nose portion defined by a corner of said front face;

said insert body having further at least one cutting edge extending immediately from said at least one nose portion and being defined by a one of a pair of intersections of said front face with an adjacent pair of side faces of said insert body that sandwich said nose portion therebetween;

said front face having at least one inclined surface sloping toward said back face in a direction away from said nose portion;

said at least one inclined surface causing each of said pair of intersections to incline toward said back face in a direction away from said nose portion;

said cutting insert further comprising a breaker formed on said at least one inclined surface along an intersection of said at least one inclined surface with at least one side face;

said front face having a tetragonal shape;

said insert body includes a pair of nose portions defined by a pair of corners of said front face;

said pair of corners being interconnected by a first diagonal line of said front face;

said front face having a pair of inclined surfaces each sloping toward said back face in a direction away from a respective nose portion such that said front face has a V-shaped contour when viewed along a second diagonal line of said front face;

said second diagonal line interconnects corners of said front face other than the corners defining said nose portions said front surface having a first area where said breaker is formed and a second area where said breaker is not formed;

said breaker having a first inner surface for defining a first rake surface portion; and said first rake surface portion being inclined more positively to a corresponding cutting edge than a second rake surface portion defined by said second area.

6. A cutting insert as recited in claim 5, wherein:

said breaker has a trough defined by said first inner surface and a second inner surface intersecting said first inner surface at a trough line; and said trough line is inclined to the corresponding cutting edge.

7. A cutting insert comprising:

a polygonal plate-like insert body defined by a front face, a back face, and a plurality of side faces lying between said front and back faces;

said insert body having at least one nose portion defined by a corner of said front face;

said insert body having further at least one cutting edge extending immediately from said at least one nose portion and being defined by a one of a pair of intersections of said front face with an adjacent pair of side faces of said insert body that sandwich said nose portion therebetween;

said front face having at least one inclined surface sloping gradually toward said back face in a direction away from said nose portion;

said at least one inclined surface causing each of said pair of intersections to incline toward said back face in a direction away from said nose portion; and at least one of said side faces slopes along the thickness of said insert body between said front and back surfaces at different angles between a first region of said at least one side face corresponding to a location of said front face where said inclined surface exists and a second region of said at least one side face corresponding to a location of said front face where there is no inclined surface.

8. A cutting insert as recited in claim 7, wherein:

at least one of said side faces slopes along the thickness of said insert body between said front and back surfaces at different angles between a first region of said at least one side face corresponding to the location of said front face at which said at least one cutting edge exists and a second region of said at least one side face corresponding to a location of said front face where there is no cutting edge.

9. A cutting insert, comprising:

a body having a front surface, a back surface, and four sides between said front and back;

said back surface being substantially planar;

said front surface meeting two adjacent ones of said sides at a nose portion;

a first one of said two adjacent sides being substantially parallel to an axial direction;

said cutting insert being adapted to rotate about said axial direction to perform a cutting operation;

a second one of said two adjacent sides being substantially perpendicular to said axial direction;

a peripheral cutting edge at an intersection of said first side with said front surface;

an end cutting edge at an intersection of said second side with said front surface;

said front surface including a planar surface intersecting said nose portion and sloping toward said back surface in a direction away from said nose portion;

a recess in said planar surface;

said recess forming a breaker for breaking metal cut by said peripheral and said end cutting edges;

said breaker running substantially along said peripheral cutting edge;

said breaker having a first end located axially toward said second side and a second end located axially away from said second side; and said first end being substantially wider than said second end.

10. Apparatus as in claim 9, wherein said first end is substantially deeper than said second end.

11. Apparatus as in claim 10, wherein:

said peripheral cutting edge has a free end located axially toward said second side and a base end located axially away from said second side;

said front surface is at least partly bounded by said peripheral and said end cutting edges;

said breaker includes a guiding inner surface and a breaking inner surface;

said guiding inner surface originates along a first line on said front surface;

said breaking inner surface originates along a second line on said front surface;

said breaking and said guiding inner surfaces slope toward a trough line where said breaking and said guiding inner surfaces intersect; and said first line intersects a line colinear with said peripheral cutting edge at a point axially away from said second side.

12. Apparatus as in claim 9, wherein:

said peripheral cutting edge has a free end located axially toward said second side and a base end located axially away from said second side;

said front surface is at least partly bounded by said peripheral and said end cutting edges;

said breaker includes a guiding inner surface and a breaking inner surface;

said guiding inner surface originates along a first line on said front surface;

said breaking inner surface originates along a second line on said front surface;

said breaking and said guiding inner surfaces slope toward a trough line where said breaking and said guiding inner surfaces intersect; and said first line intersects a line colinear with said peripheral cutting edge at a point axially away from said second side.

13. Apparatus as in claim 12, wherein:

a gap between said first line and said peripheral cutting edge defines a first land portion of said front surface having a first breadth extending between said first line and said peripheral cutting edge;

a gap between said breaker and said end cutting edge defines a second land portion of said front surface having a second breadth extending between said breaker and said end cutting edge; and said second breadth is greater than said first breadth.

14. Apparatus as in claim 13, wherein:

said first land portion is substantially parallel to said back surface;

said guiding surface is sloped toward said back surface; and said breaking inner surface is substantially parallel to said back surface.

* * * * *

UNITED STATES PATENT AND TRADEMARK OFFICE
CERTIFICATE OF CORRECTION

PATENT NO. : 5,460,464

DATED : October 24, 1995

INVENTOR(S) : Tatsuo ARAI and Takayoshi SAITO

It is certified that an error appears in the above-identified patent and that said Letters Patent is hereby corrected as shown below:

Column 1, line 37, change "tile" to --the--;

Column 2, lines 3 and 17, change "tile" to --the--;

Column 4, lines 10, 24 and 63, change "tile" to --the--;

Column 5, line 3, change "tile" to --the--.

Signed and Sealed this

Second Day of April, 1996

Attest:

BRUCE LEHMAN

*Attesting Officer*   *Commissioner of Patents and Trademarks*